United States Patent
Tsai et al.

[11] Patent Number: 5,807,431
[45] Date of Patent: Sep. 15, 1998

[54] WATER-BORNE POLYURETHANE-MODIFIED CEMENT COMPOSITION

[75] Inventors: Fan-Jeng Tsai; Chen-Ann Huang; Hsiao-Chian Li, all of Hsinchu, Taiwan

[73] Assignee: Industrial Technology Research Institute, Hsinchu, Taiwan

[21] Appl. No.: 856,638

[22] Filed: May 15, 1997

[51] Int. Cl.$^6$ .................................................. C04B 26/16
[52] U.S. Cl. ........................ 106/696; 106/724; 106/727; 106/823; 524/2
[58] Field of Search ...................... 106/696, 724, 106/727, 728, 822, 823, 802, 828, 810; 524/2, 5

[56] References Cited

U.S. PATENT DOCUMENTS

| | | |
|---|---|---|
| 3,915,917 | 10/1975 | Weiant et al. . |
| 4,059,551 | 11/1977 | Weiant et al. . |
| 4,939,191 | 7/1990 | Kataoka et al. .......................... 106/727 |
| 5,185,389 | 2/1993 | Victor ...................................... 106/802 |
| 5,192,366 | 3/1993 | Nishioka et al. ........................ 106/724 |

FOREIGN PATENT DOCUMENTS

| | | |
|---|---|---|
| 2229094 | 1/1973 | Germany . |
| 07309653 | 11/1995 | Japan . |

*Primary Examiner*—Paul Marcantoni
*Attorney, Agent, or Firm*—W. Wayne Liauh

[57] ABSTRACT

A water-borne polyurethane modified cement composition is prepared from a dispersion of a water-dispersible polyurethane, a cross-linking agent, which is a polycarbodimide having $N{=}C{=}N$ functional groups, and cement. Optionally, a water-reducing agent, and a surfactant can be added. The modified cement composition has higher tensile strength, elongation, and water resistance.

4 Claims, 3 Drawing Sheets

1

WATER-BORNE POLYURETHANE-MODIFIED CEMENT COMPOSITION

BACKGROUND OF THE INVENTION

The invention relates to a modified cement, and in particular relates to a water-dispersible polyurethane-modified latex cement composition.

Cement is a material of high hardness. However, due to failure of absorbing stresses produced from various physical changes, thermal expansion, apertures, and cracks occurs on cements during the drying process. Adding flexible materials, such as polymer latexes, to cement can not only absorb the thermal expansion and stress that occur on cements but can also seal the apertures formed, thereby achieving a water-resistant effect.

Latexes form from special resins when they are uniformly dispersed in water. Usually, the size of the dispersed resins ranges from several tens of microns to several hundred microns and the content of the resin in the latex is 10~70 wt %. When the water in the latex volatilizes, a soft and elastic film, just like a rubber, forms. Polymer latexes are tacky, and thus are often used as adhesives in the preparations of paper boards, adhesive tapes, non-woven fabrics, and tiles.

Both latexes and cements possess adhensive effect, and when they are properly mixed together to posses the softness of the latex and simultaneously the rigidity of the cement, a superior water resistant effect is obtained. The latexes often used in building industries include acrylic latexes, ethylene-vinyl acetate latexes and styrene-butadiene rubber latexes. Acrylic latexes are usually composed of soft segments and hard segments, for example, latexes prepared from ethylene-hexylene acrylics and methylacrylics. The former functions as a soft segment and is similar to an elastomer while the latter functions as a hard segment and is similar to glass. When the ratio of the soft segments increases, the water-resistant effect of the resulting latexes is enhanced. Moreover, some kinds of latex have carboxyl functional groups which improve the adhesive capacity and increase both physical and chemical stability. However, if the content of the carboxyl functional groups is too high, the resulting latexes become moisture-absorbing and do not dry easily.

Ethylene-vinyl acetate latexes are synthesized from ethylene and vinyl acetate, wherein the ethylene component constitutes the soft segment and the ethylene acetate constitutes the hard segments. Ethylene-vinyl acetate latexes adhere well to many matrix materials due to their high polarity.

Styrene-butadiene rubber latexes are synthesized from styrene and butadiene. Styrene is a hard material, and like glass, is crisp and hard. The butadiene is a soft material and, like rubber, is flexible and elastic.

Water-dispersible polyurethanes are synthesized from isocyanates, polyols and carboxylic acids. If the proportion of isocyanates is large, the synthesized polyurethane is rigid, while if more polyol is added, the synthesized polyurethane is more flexible. By properly combining the two ingredients, it is possible to obtain a rigid and tough polyurethane material. Further, by controlling molecular weight and incorporating hydrohilic groups, the resulting polyurethanes can be endowed with hydrophilic properties.

Latex cements are prepared by mixing latexes and cements in a predetermined ratio. The mixing method includes first adding the latexes in a container, and stirring the latexes while adding the cement gradually. If necessary, aids such as water-reducing agents, defoamers can also be added to the mixture to improve the processability and the surface smoothness of the resulting latex cement. Alternatively, laxtex cement can be prepared by first mixing cement with an appropriate amount of water, then adding the resultant mixture to the latex gradually to obtain a homogenous mixture. Mixing process is performed by using an agitator and rotation speed are usually from 50 rpm to 300 rpm. When the latex cement is applied in a building workplace, it is directly poured on the job site after a uniform mixing, and is flatted by using a tool for example a trowel. The latex cement sets in about 2~3 days and becomes completely cured in about 28 days.

U.S. Pat. No. 5,176,733 discloses a cement admixture composition in which acrylic copolymers are used to modify cement and the amount of the copolymer is 13.3~30 parts by weight.

U.S. Pat. No. 5,192,366 discloses a cement admixture which is modified by vinyl-acetate latex.

U.S. Pat. No. 5,308,397 discloses a base coat for interior and exterior walls of buildings, comprising a styrene-butadiene rubber as a modifier.

U.S. Pat. No. 5,310,780 discloses sealant from polyurethane dispersions which is directly applied on porous substrates such as wood, concrete, cement, brick and the like for protecting them, and is not used as a mixture with cement.

Referring to FIGS. 1a–1d, these figures show the film forming process of latex according to prior art. As shown in FOG. 1a, latex particles are dispersed in water uniformly. And when the water volatilizes, latex particles become closer and closer, and accumulate, distort and fuse, as shown in FIG. 1b and FIG. 1c. Finally, the latex particles form a film, as shown in FIG. 1c. Note that when the latex particles accumulate, they are combined by physical attractive force.

When the above latex materials are incorporated into cement, they are connected together and thus become irregular lines between the aperture of the cement, forming many irregular structures, as is shown in FIGS. 2a and 2b.

As explained above, the known latex particles in a dispersion are combined by only physical attractive force, both tensile strength and elongation of the cements modified by the latex materials are not satisfactory.

SUMMARY OF THE INVENTION

It is therefore an object of the invention to provide a latex-modified cement composition which displays higher tensile strength and elongation.

To attain the object of the invention, the modified cement composition of the present invention utilizes an water-dispersible polyurethane dispersion as a latex material and an appropriate cross-linking agent is added thereto so that when latex particles accumulate, the carboxylic groups that take part in the chemical reaction react with the cross-linking agent, forming a cross-linking structure and generating chemical bonds therebetween. The tensile strength and the elongation of the latex cement are thus improved.

BRIEF DESCRIPTION OF THE DRAWINGS

The present invention will be described in further detail with reference to the examples and the drawings, in which.

DETAILED DESCRIPTION OF THE INVENTION

According to the present invention, the water-dispersible polyurethane-modified cement composition includes: (a) a dispersion of an water-borne polyurethane; (b) a cross-linking agent; and (c) a cement. Note the weight ratio of the polyurethane in the dispersion to the cement ranges from 1.3/1.0 to 1.0/1.0 and the weight ratio of the cross-linking agent to the cement ranges from 1/100 to 3/100.

The polyurethane-modified cement composition of the invention can be prepared by first mixing an water-borne polyurethane dispersion with an appropriate cross-linking agent to form a pre-mixture, mixing cement with water to form an water-borne cement, and then pouring the water-borne cement into the pre-mixture and mixing them homogeneously.

The water-dispersible polyurethanes suitable use in the invention are synthesized from isocyanates and polyols with the addition of appropriate cross-linking agents. The characteristics of the water-dispersible polyurethane thus can be modified by adjusting the weight ratios of polyurethane, polyols and cross-linking agents.

The cement material includes various Portland cements such as normal Portland cement, high early strength Portland cement, super high early strength Portland cement and White Portland cement, as well as rapid hardening cements and alumina cements.

Examples of cross-linking agents suitable for use in the invention include but are not limited to polycarbodiimides, polyisocyanates, aqeous epoxy resins, melamine-formaldehyde resin, oxazolidine, zinc salts, cobalt salts and their complexes. Among them, polycarboimides having $N=C=N$ functional groups are preferred.

Optionally, water-reducing agents such as benzene sulfonates, melamine-formaldehydes, carboxylic hydroxides, low molecular borates and phosphates can be added to reduce the water content, thus allowing the cement composition to dry in a short time period and assisting the mixing process. Surfactants such as defoamers can be added to reduce the bubbles.

Figure 1A:
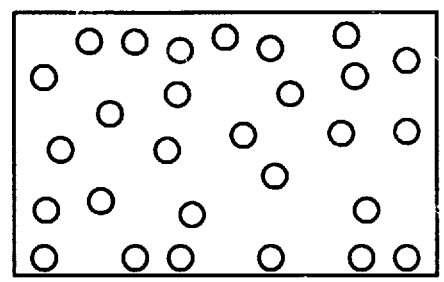
FIGS. 1a–1d are schematic views illustrating the film-forming process of latex particles in a dispersion according to the prior art.
Figure 1B:
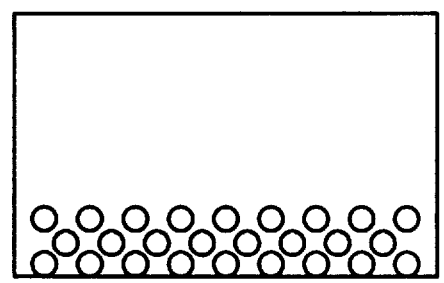
Figure 1C:
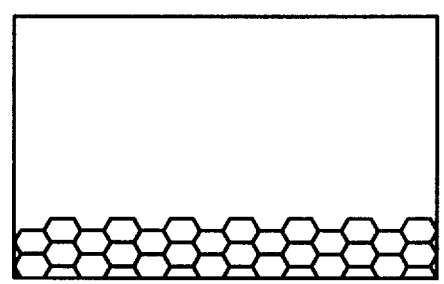
Figure 1D:
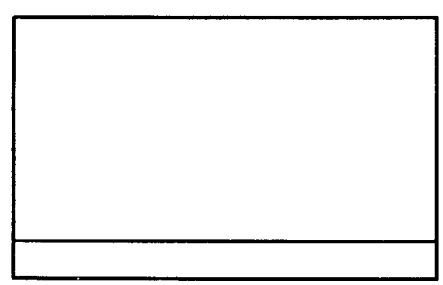
Figure 2A:
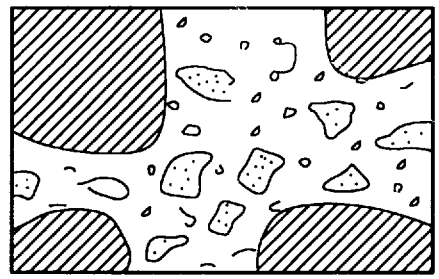
FIGS. 2a–2b are schematic microviews illustrating the forming process of a latex cement structure according to the prior art.
Figure 2B:
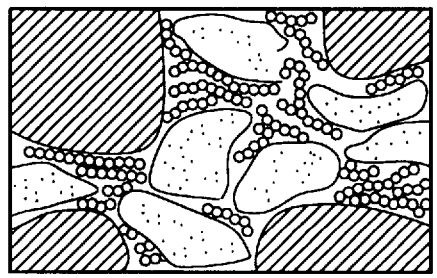
Figure 3A:
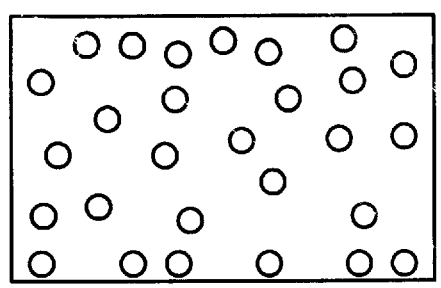
FIGS. 3a–3d are schematic views illustrating the film-forming process of an water-dispersible polyurethane dispersion according to the present invention.
Figure 3B:
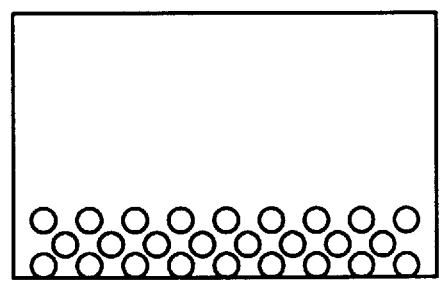
Figure 3C:
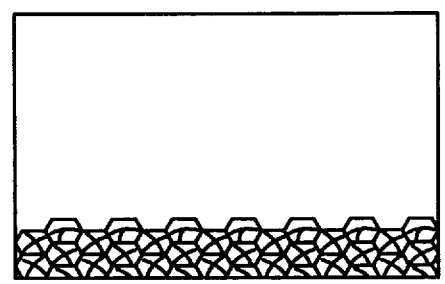
Figure 3D:
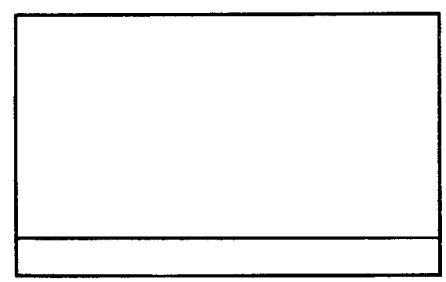

Referring to FIGS. 3a–3d, when the polyurethane latex particles are dispersed in water (FIG. 3a), moisture contained therein participates in the hydration reaction of the cement and brings the latex particles closer and closer (FIG. 3b). Thereafter the latex particles accumulate, distort and fuse, as shown in FIG. 3c. Finally, the latex particles form a film, as shown in FIG. 3d. The polyurethane of the present invention contains carboxyl functional groups capable of participating in a chemical reaction, which react with cross-liking agents such as polycarbodiimides. The mechanism is illustrated by the following reaction scheme.

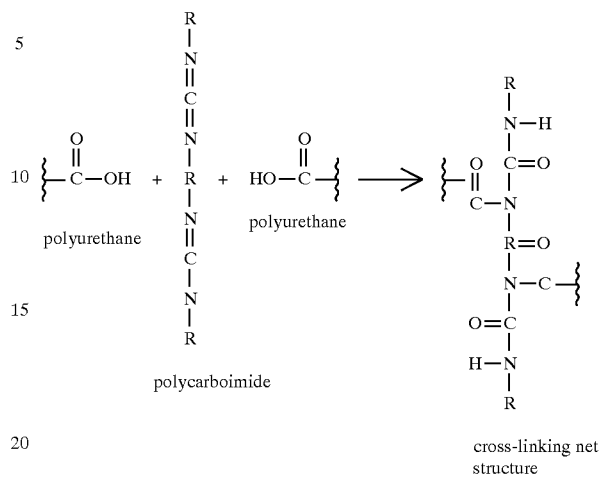

cross-linking net structure

Since the latex particles of water-dispersible polyurethane form a net structure by the above-mentioned cross-linking reaction (FIG. 3c), and water-dispersible polyurethane materials per se have high elongation, the modified cement of the invention has the advantages of high tensile strength and elongation.

The following examples are intended to demonstrate the invention more fully without acting as a limitation upon its scope, since numerous modifications and variations will be apparent to those skilled in this art.

EXAMPLE 1

To 130 grams of a dispersion of water-dispersible polyurethane (Bayer Co., U.S.A. 50UD, solid content 45%), was added 1 gram of polycarbodiimide (Union carbide Co., U.S.A., 29SE), and the resulting mixture was stirred with a agitator at 300 rpm for 3 minutes. 100 grams of cement (Taiwan Cement Co., Type I) was then mixed with 50 grams of deionized water and 3 grams of a water reducing agent (Li Shen Co. Ltd, Taiwan, AB-DIS) until homogenous. The cement mixture was then poured into the water-dispersible polyurethane dispersion while stirring at the same speed for the same time period to obtain the modified cement composition. The cement composition was then gradually poured onto released papers and flatted to a thickness of 2–3 mm to form standard specimens. Characteristics, such as tensile strength, elongation and water-resistance were measured and the results are summarized in Table 1 below.

EXAMPLE 2

To 130 grams of a dispersion of water-borne polyurethane (Bayer Co., U.S.A. 50UD, solid content 45%), was added 3 grams of polycarbodiimide (Union carbide Co.,U.S.A., 29SE), and the resulting mixture was stirred with a agitator at 300 rpm for 3 minutes. 100 grams of cement (Taiwan Cement Co., Type I) was then mixed with 60 grams of deionized water until homogenous. The cement mixture was then gradually poured into the water-borne polyurethane dispersion while stirring at the same speed for the same time period to obtain the modified cement composition. The cement composition was then poured onto released papers and flatted to a thickness of 2–3 mm to form standard specimens. Characteristics, such as tensile strength, elongation and water-resistance were measured and the results are summarized in Table 1 below.

EXAMPLE 3

To 130 grams of a dispersion of water-borne polyurethane (Bayer Co., U.S.A. 50UD, solid content 45%), was added 3 grams of polycarbodiimide (Union carbide Co.,U.S.A., 29SE), and the resulting mixture was stirred with a agitator at 300 rpm for 3 minutes. 100 grams of cement (Taiwan Cement Co., Type I) was then mixed with 60 grams of deionized water and 3 grams of a water reducing agent (Union chemical Co. Ltd, Taiwan, L-10) until homogenous. The cement mixture was then poured into the water-borne polyurethane dispersion while stirring at the same speed for the same time period to obtain the modified cement composition. The cement composition was then gradually poured onto released papers and flatted to a thickness of 2–3 mm to form standard specimens. Characteristics, such as tensile strength, elongation and water-resistance were measured and the results are summarized in Table 1 below.

EXAMPLE 4

To 100 grams of a dispersion of water-borne polyurethane (product of Industrial Technology Research Institute, solid content 40%), was added 1 gram of polycarbodiimide (Union carbide Co.,U.S.A., 29SE), and the resulting mixture was stirred with a agitator at 300 rpm for 3 minutes. 100 grams of cement (Taiwan Cement Co., Type I) was then mixed with 50 grams of deionized water and 3 grams of water reducing agent (Union chemical Co. Ltd, Taiwan,L-10) until homogenous. The cement mixture was then poured to the water-borne polyurethane dispersion while stirring at the same speed for the same time period to obtain the modified cement composition. The cement composition was then gradually poured onto relased papers and flatted to a thickness of 2–3 mm to form standard specimens. Characteristics, such as tensile strength, elongation and water-resistance were measured and the results are summarized in Table 1 below.

COMPARATIVE EXAMPLE 1

100 grams of a dispersion of acrylics latex (Eternal chemical Co. Ltd. ETERSOL 691) and 100 grams of cement (Taiwan Cement Co.,Type I) were stirred at 300 rpm with an agitator for 3 minutes. The resulting cement composition was then gradually poured onto released papers and flatted to a thickness of 2–3 mm to form standard specimens. Characteristics, such as tensile strength, elongation and water-resistance were measured and the results are summarized in Table 1 below

TABLE 1 unit: gram

| Example No. | Polyurethane | Cement | Deionized water | Cross-linking agent | Water reducing agent | Acrylics latex | Tensile strength (kgf/cm$^2$) | Elongation (%) | Water-resistance (12 hours) |
|---|---|---|---|---|---|---|---|---|---|
| Comparative example 1 | — | 100 | — | — | — | 100 | 20 | 18 | acceptable |
| Example 1 | 130 | 100 | 50 | 1 | 3 | — | 80 | 60 | acceptable |
| Example 2 | 130 | 100 | 60 | 3 | — | — | 60 | 55 | acceptable |
| Example 3 | 100 | 100 | 60 | 3 | 3 | — | 40 | 40 | acceptable |
| Example 4 | 100 | 100 | 50 | 1 | 3 | — | 40 | 25 | acceptable |

Note:
(1) tensile strength and elongation were tested in accordance with CNS 6988
(2) water resistance was tested in accordance with CNS 4684

It can be seen from Table 1 that the modified cements of the invention have better tensile strength and elongation.

What is claimed is:

1. A water-dispersible polyurethane-modified cement composition, comprising:
    (a) a dispersion of an water-dispersible polyurethane;
    (b) a cross-linking agent; and
    (c) a cement, wherein the weight ratio of the polyurethane in said dispersion to said cement ranges from 1.3/1.0 to 1.0/1.0; and the weight ratio of said cross-linking agent to said cement ranges from 1/100 to 3/100;
    (d) further wherein said cross-linking agent is a polycarbodiimide having N=C=N functional groups.

2. The water-dispersible polyurethane-modified cement composition according to claim 1, further comprising a water-reducing agent.

3. The water-dispersible polyurethane-modified cement composition according to claim 2, wherein said water-reducing agent is selected from the group consisting of benzene sulfonates, melamine-formaldehydes, carboxylic hydroxides, borates and phosphates.

4. The water-dispersible polyurethane-modified cement composition according to claim 1, further comprising a surfactant.

* * * * *